(12) United States Patent
Wei et al.

(10) Patent No.: US 12,353,562 B2
(45) Date of Patent: Jul. 8, 2025

(54) AUTOMATIC EVENT GRAPH CONSTRUCTION METHOD AND DEVICE FOR MULTI-SOURCE VULNERABILITY INFORMATION

(71) Applicant: YANGZHOU UNIVERSITY, Jiangsu (CN)

(72) Inventors: Ying Wei, Jiangsu (CN); Xiaobing Sun, Jiangsu (CN); Lili Bo, Jiangsu (CN); Bin Li, Jiangsu (CN); Xingqi Cheng, Suzhou (CN)

(73) Assignee: YANGZHOU UNIVERSITY (CN)

( * ) Notice: Subject to any disclaimer, the term of this patent is extended or adjusted under 35 U.S.C. 154(b) by 614 days.

(21) Appl. No.: 17/696,126

(22) Filed: Mar. 16, 2022

(65) Prior Publication Data
US 2023/0035121 A1   Feb. 2, 2023

(30) Foreign Application Priority Data
Jul. 22, 2021   (CN) .......................... 202110828495.7

(51) Int. Cl.
  *G06F 21/57*   (2013.01)
  *G06F 8/41*    (2018.01)
  *G06N 3/08*    (2023.01)
(52) U.S. Cl.
  CPC ............ *G06F 21/577* (2013.01); *G06F 8/427* (2013.01); *G06F 8/433* (2013.01); *G06N 3/08* (2013.01)

(58) Field of Classification Search
  CPC ........ G06F 21/577; G06F 8/427; G06F 8/433; G06N 3/0442; G06N 3/0455; G06N 3/08; G06N 3/09; G06N 7/01
  See application file for complete search history.

(56) References Cited

U.S. PATENT DOCUMENTS

| | | | |
|---|---|---|---|
| 2021/0152589 A1* | 5/2021 | Waplington | G06F 16/2282 |
| 2022/0400131 A1* | 12/2022 | Shao | G06N 3/0455 |
| 2023/0075290 A1* | 3/2023 | Wåreus | G06F 21/577 |

* cited by examiner

*Primary Examiner* — Jason D Recek
(74) *Attorney, Agent, or Firm* — Eckert Seamans Cherin & Mellott LLC

(57) ABSTRACT

Provided is an automatic event graph construction method for multi-source vulnerability information. The method includes the following steps. A vulnerability report is crawled from a vulnerability database, a cause of vulnerability is taken as an event trigger word, and a vulnerability type is determined through the cause of vulnerability. An attacker, consequence, location and other information in a description are identified by named-entity recognition, and information completion is performed. An explicit relation between events is extracted by using text information, an implicit relation between events is extracted by using text similarity, and vulnerability-related code representation is performed. Obtained vulnerability event information is visualized into an event graph through a visualization tool.

11 Claims, 10 Drawing Sheets

*Double free vulnerability in the xfrm6_tunnel_rcv function in ···*
B-Trigger I-Trigger I-Trigger    O   O        O       O    O

FIG. 3

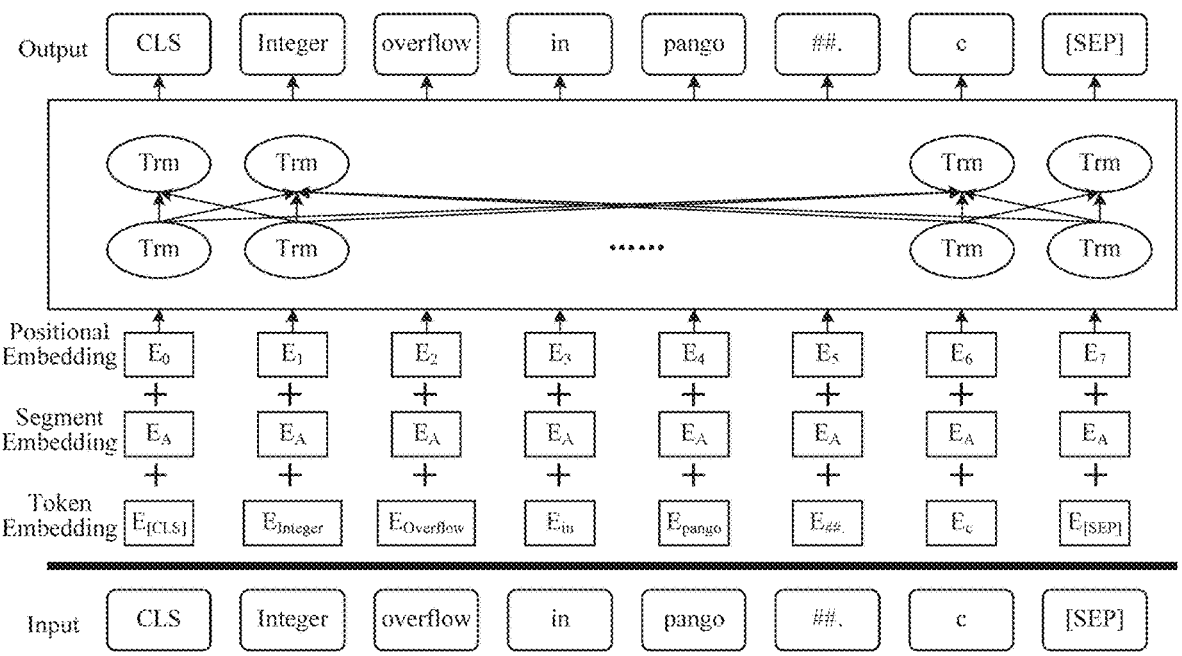

FIG. 4

*Double free vulnerability in the xfrm6_tunnel_rcv function in*
  O     O      O     O   O      B-Loc      I-Loc    I-Loc
*net/ipv6/xfrm6_tunnel.c in the Linux kernel before 2.6.22, when*
     I-Loc         O    O   B-Ver   I-Ver    I-Ver     I-Ver     O
*the xfrm6_tunnel module is enabled, allows remote attackers*
  O      B-Sit        I-Sit     I-Sit    I-Sit     O      B-Atk    I-Atk
*to cause a denial of service (panic) via crafted IPv6 packets.*
  O     O     O     B-Con    I-Con   I-Con    I-Con    O    B-Ope    I-Ope    I-Ope

FIG. 5

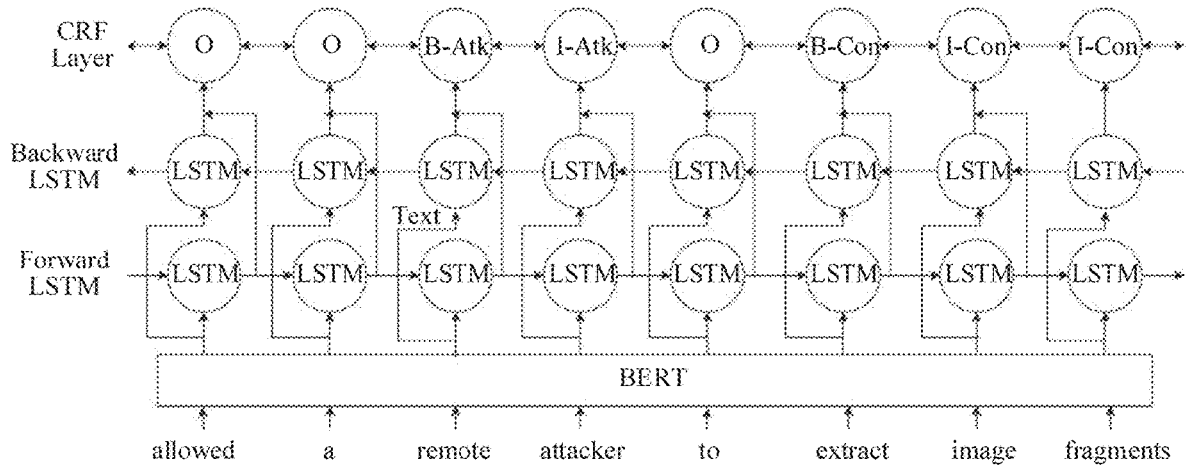

FIG. 6

In Apache httpd 2.2.x before 2.2.33 and 2.4.x before 2.4.26,
                              Affected version
mod_ssl may dereference a NULL pointer when third-party
Location                         Trigger word
modules call ap_hook_process_connection() during an HTTP
              Triggering operation
request to an HTTPS port.
    Occurrence situation

FIG. 7A

Apache HTTPD is vulnerable to a denial of service, caused by a
NULL pointer dereference in mod_ssl. By sending a specially
crafted HTTP request to an HTTPS port, a remote attacker could
                                        Attacker
exploit this vulnerability to cause a denial of service.
                              Consequence

AUTOMATIC EVENT GRAPH CONSTRUCTION METHOD AND DEVICE FOR MULTI-SOURCE VULNERABILITY INFORMATION

CROSS-REFERENCE TO RELATED APPLICATION

This application claims priority to Chinese Patent Application No. 202110828495.7 filed on Jul. 22, 2021, the disclosure of which is incorporated herein by reference in its entirety.

TECHNICAL FIELD

The present disclosure belongs to the field of software security, and in particular, relates to an automatic event graph construction method and device for multi-source vulnerability information.

BACKGROUND

With the advent of the big data era, high-quality data set has become an important foundation of scientific research, and thus, whether the vulnerability research succeeds also determines the quality of vulnerability data sets. There are various existing vulnerability data sets, but the lack of the standards of data sets causes messy information content, lack of information types and other issues. Therefore, it is necessary to automatically construct a regular, standardized and more usable vulnerability event graph, and the graph is required to include vulnerability occurrence information of multiple data sources and transform originally messy information into regular knowledge, thereby helping developers to intuitively understand, analyze and use vulnerabilities, reducing the human resources for the construction of vulnerability data sets, and supporting the subsequent vulnerability analysis and diagnosis.

Event knowledge graph extracts events, entities, attributes, relations and the like from a natural language text to perform knowledge fusion and then constructs a system framework through the ontology, and the system framework is stored in the form of a structured triple. At present, some efforts have been taken to construct event graphs. For example, the document "Building event-centric Knowledge Graphs from News" puts forward an event-centered knowledge graph, which extracts events from news reports, including time, locations and participants, establishes a causal relation and a coreference relation between events, and reconstructs historical development and time evolution. Some research also put forward multilingual event-centric temporal knowledge graphs. For example, the document "Eventkg: A Multilingual Event-centric Temporal Knowledge Graph" extracts 690,000 contemporary and historical events and more than 2.3 million temporal relations from large-scale knowledge graphs such as DBpedia and fuses the extracted events, entities and relations. Most of the existing studies on event knowledge graphs focus on the fields of history, finance and news, but seldom involve other fields. The public patents in the related art are all traditional security vulnerability-based knowledge graph construction methods, which regard vulnerabilities as entities and some basic attributes in vulnerability reports as entity attributes, such as product names, Common Weakness Enumeration Identifiers (CWE-IDs), Common Vulnerability Scoring System (CVSS) scores, and issue dates. The vulnerability itself is a process event, and in addition to the above-mentioned basic attributes, also includes event attributes such as triggering conditions, causes, consequences, and locations. It is difficult for traditional knowledge graphs to represent these event attributes, so it is feasible to use event graphs to represent vulnerability events.

SUMMARY

The object of the present disclosure is to, in view of the problems existing in the above situation, provide an automatic event graph construction method and device for multi-source vulnerability information, so as to integrate and identify various information related to vulnerabilities and visualize the information into a vulnerability event graph.

Technical solution: in order to achieve the object as described above, the technical solution of the present disclosure is an automatic event graph construction method for multi-source vulnerability information. The method includes steps 1 to 6.

In step 1, a vulnerability report is crawled from a vulnerability database according to a Common Vulnerabilities and Exposures identifier (CVE-ID), and a vulnerability report data set is constructed.

In step 2, a cause of vulnerability is taken as an event trigger word, a vulnerability event trigger word label set is constructed, a trigger word of a vulnerability event is extracted, and a vulnerability type is determined through the trigger word.

In step 3, vulnerability event elements are extracted from description information of a vulnerability by named-entity recognition, and information completion is performed.

In step 4, an explicit relation between vulnerability events is extracted by using text information, and an implicit relation between vulnerability events is extracted by using text similarity.

In step 5, vulnerability-related code representation is performed.

In step 6, vulnerability event information obtained from steps 2 to 5 is visualized into a vulnerability event graph; where the graph includes vulnerability event related elements and a relation between vulnerability events, and vulnerability events are associated with vulnerability types through the event trigger word.

Further, in step 1, a vulnerability report is collected from vulnerability databases Common Vulnerabilities and Exposures (CVE), National Vulnerability Database (NVD) and IBM X-Force Exchange according to the CVE-ID, and description information, an issue date, a Common Vulnerability Scoring System (CVSS) score, a Common Weakness Enumeration (CWE) category and a related link in the report are acquired to obtain the vulnerability report data set.

Further, in step 2, a sequence labeling task of a Bidirectional Encoder Representations from Transformers (BERT) model is trained by using a vulnerability event trigger word label set, and a trigger word is extracted by using the trained model; and the extracted trigger word is classified by using a so max classifier, where the vulnerability type includes at least one of a time-related vulnerability, a configuration vulnerability, an input validation vulnerability, a memory vulnerability, a logic resource vulnerability, a numeric vulnerability or an unknown vulnerability.

Further, the vulnerability event elements extracted in step 3 include a triggering operation, an occurrence situation, an attacker, an affected version, a consequence, and a location, and a sequence labeling task of a BERT model is trained by using a constructed vulnerability event element label set, and event element extraction is performed by connecting a Bi-Directional Long Short-Term Memory (BiLSTM) layer and a Conditional Random Field (CRF) layer using the trained model.

Further, in step 3, in a case where part of the event elements are missed in CVE and NVD descriptions, the event elements are completed by using a description in IBM X-Force Exchange.

Further, in step 4, an explicit relation between vulnerability events is extracted through a sentence pattern template, where an explicit vulnerability relation type includes at least one of a similar relation, a causal relation, a brother relation, a regression relation, an included relation or a dependency relation.

Further, in step 4, a vulnerability implicit similar relation is extracted by calculating a vectorized cosine similarity of vulnerability description information.

Further, in step 5, a vulnerability code is represented as at least one of an abstract syntax tree (AST), a control-flow graph (CFG) or a program dependence graph (PDG).

Based on the same invention concept, the present disclosure provides an automatic event graph construction system for multi-source vulnerability information. The system includes a data set construction module, a trigger word extraction module, a vulnerability event element identification module, a vulnerability event relation identification module, a vulnerability code representation module, and a visualization module.

The data set construction module is configured to crawl a vulnerability report from a vulnerability database according to a CVE-ID and construct a vulnerability report data set.

The trigger word extraction module is configured to take a cause of vulnerability as an event trigger word, construct a vulnerability event trigger word label set, extract a trigger word of a vulnerability event, and determine a vulnerability type through the trigger word.

The vulnerability event element identification module is configured to extract vulnerability event elements from description information of a vulnerability by named-entity recognition and perform information completion.

The vulnerability event relation identification module is configured to extract an explicit relation between vulnerability events by using text information and extract an implicit relation between vulnerability events by using text similarity.

The vulnerability code representation module is configured to perform vulnerability-related code representation.

The visualization module is configured to visualize obtained vulnerability event information into a vulnerability event graph; where the graph includes vulnerability event related elements and a relation between vulnerability events, and vulnerability events are associated with vulnerability types through the event trigger word.

Based on the same invention concept, the present disclosure provides an automatic event graph construction device for multi-source vulnerability information. The device includes a memory, a processor, and a computer program stored on the memory and executable by the processor, where the computer program, when loaded into the processor, performs the above-mentioned automatic event graph construction method for multi-source vulnerability information.

Beneficial effect: Compared with the related art, the present disclosure has the following significant advantages: 1) according to the characteristic that the vulnerability itself is a process event, the event graph of the vulnerability field is constructed, and compared with the common vulnerability data set, with such an event graph, the developers can more intuitively understand vulnerability events and the related event factors thereof; and compared with the existing vulnerability graph construction technology, the present disclosure is not limited to the extraction of the existing elements and relations in the vulnerability report, but extracts the event elements and implicit relations in the report text by using an algorithm. 2) With the observation of the vulnerability report, the elements of vulnerability events are defined and extracted by using a BERT+BiLSTM+CRF model, including a triggering operation, an affected version, an attacker, a consequence, and a location, thereby representing vulnerability events more comprehensively. 3) Given the missing of event elements, this study is not limited to the vulnerability description in CVE/NVD, but also completes the event elements by using the description in IBM X-Force Exchange, thereby enabling the constructed event graph to be more complete. 4) In terms of event relations, both explicit and implicit relations between vulnerability events are involved in this study, and not only the explicit relation between events is directly obtained from description statements, but also the implicit relation between events is determined by calculating the similarity between description statements, thereby fully exploring the relations between vulnerability events. 5) Given the domain characteristics of vulnerability events, not only the event elements are extracted from the description text, but also the vulnerability code semantic information is represented by the combination of various code maps, thereby enriching the vulnerability event graph.

BRIEF DESCRIPTION OF DRAWINGS

FIG. 3 is a schematic diagram of vulnerability event trigger word labelling according to an embodiment.

FIG. 4 is a schematic diagram of BERT model training according to an embodiment.

FIG. 5 is a schematic diagram of vulnerability event element labelling according to an embodiment.

FIG. 6 is a schematic diagram of a BERT+BiLSTM+CRF model according to an embodiment.

FIGS. 7A and 7B are schematic diagrams of event element labelling of CVE-2017-3169 in CVE/NVD (FIG. 7A) and IBM X-Force Exchange (FIG. 7B) according to an embodiment.

FIGS. 9A and 9B are schematic diagrams of implicit relations between vulnerability events according to an embodiment.

DETAILED DESCRIPTION

To make the objects, solutions and advantages of the present application more apparent, a more detailed description is given hereinafter to illustrate the present application in conjunction with drawings and embodiments. It is to be understood that the embodiments described herein are intended to explain the present application and not to limit the present application.

Figure 1:
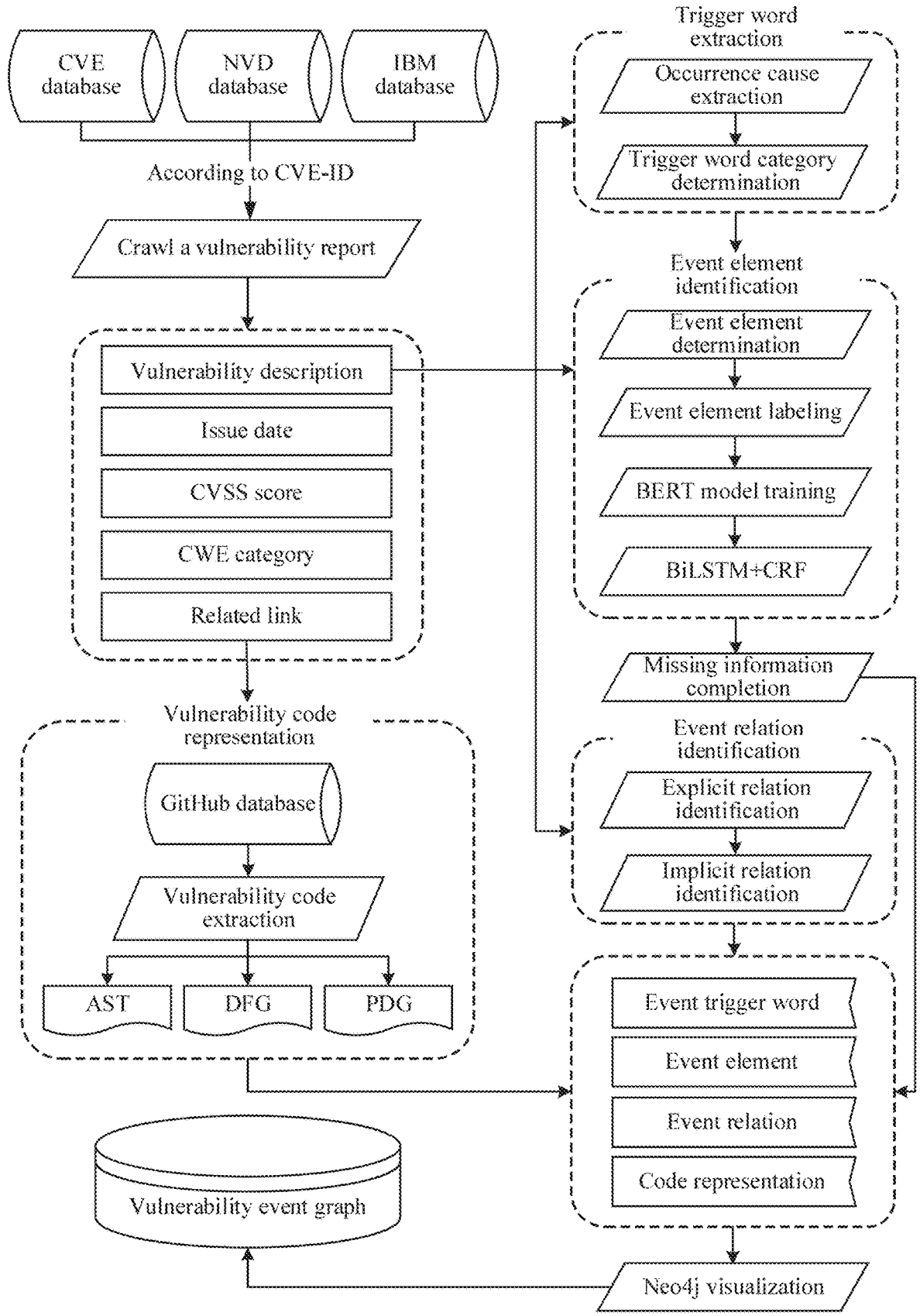
FIG. 1 is a flowchart of an automatic event graph construction method for multi-source vulnerability information according to an embodiment.

In an embodiment, in conjunction with FIG. 1, the present disclosure provides an automatic event graph construction method for multi-source vulnerability information. First, a vulnerability report is crawled from a vulnerability database according to a CVE-ID, and a vulnerability report data set is constructed. Second, a cause of vulnerability is taken as an event trigger word to identify a vulnerability event, and a vulnerability type is determined through the event trigger word. Third, description text information of a vulnerability is labeled, information such as an attacker, a consequence, and a location in the description is identified by named-entity recognition, and information completion is performed. Fourth, an explicit relation between events is extracted by using text information, and an implicit relation between events is extracted by using text similarity. Fifth, vulnerability-related codes are represented in a code representation manner such as AST, PDG, and CFG. Finally, the vulnerability-related codes are visualized with a visualization tool into a vulnerability event graph. The main steps are summarized as follows.

In step 1, constructing a vulnerability report data set;

In step 2, extracting an event trigger word and determining a vulnerability type through the trigger word;

In step 3, extracting vulnerability event elements and performing information completion; In step 4, extracting a relation between vulnerability events;

In step 5, performing vulnerability-related code representation; and

In step 6, visualizing vulnerability event information obtained in the above steps into a vulnerability event graph.

Further, in an embodiment, the process of constructing the vulnerability report data set in step 1 includes steps 1-1 and 1-2.

Figure 2A:
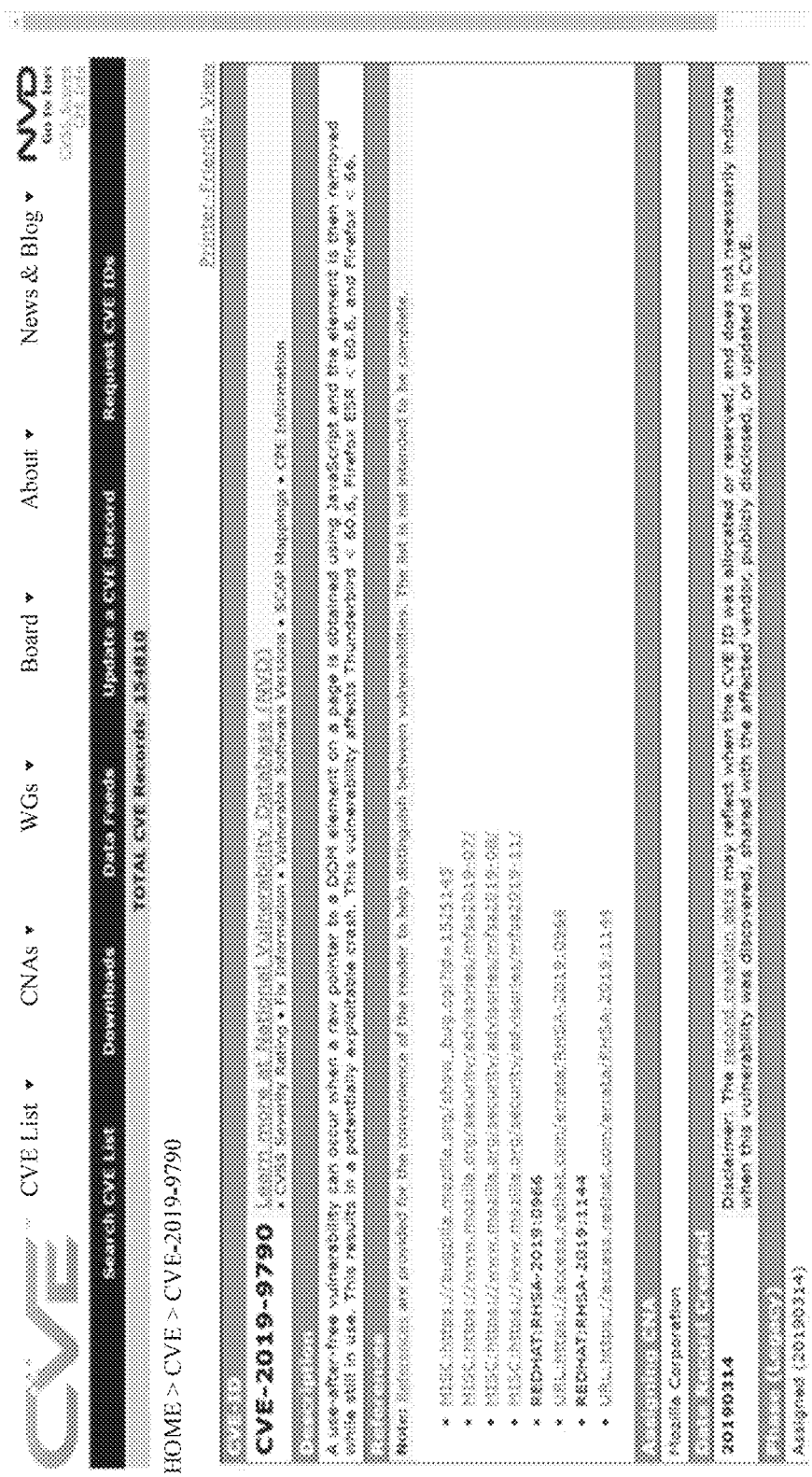
FIGS. 2A, 2B and 2C are screenshots of vulnerability reports of CVE, NVD, and IBM X-Force Exchange according to an embodiment.
Figure 2B:
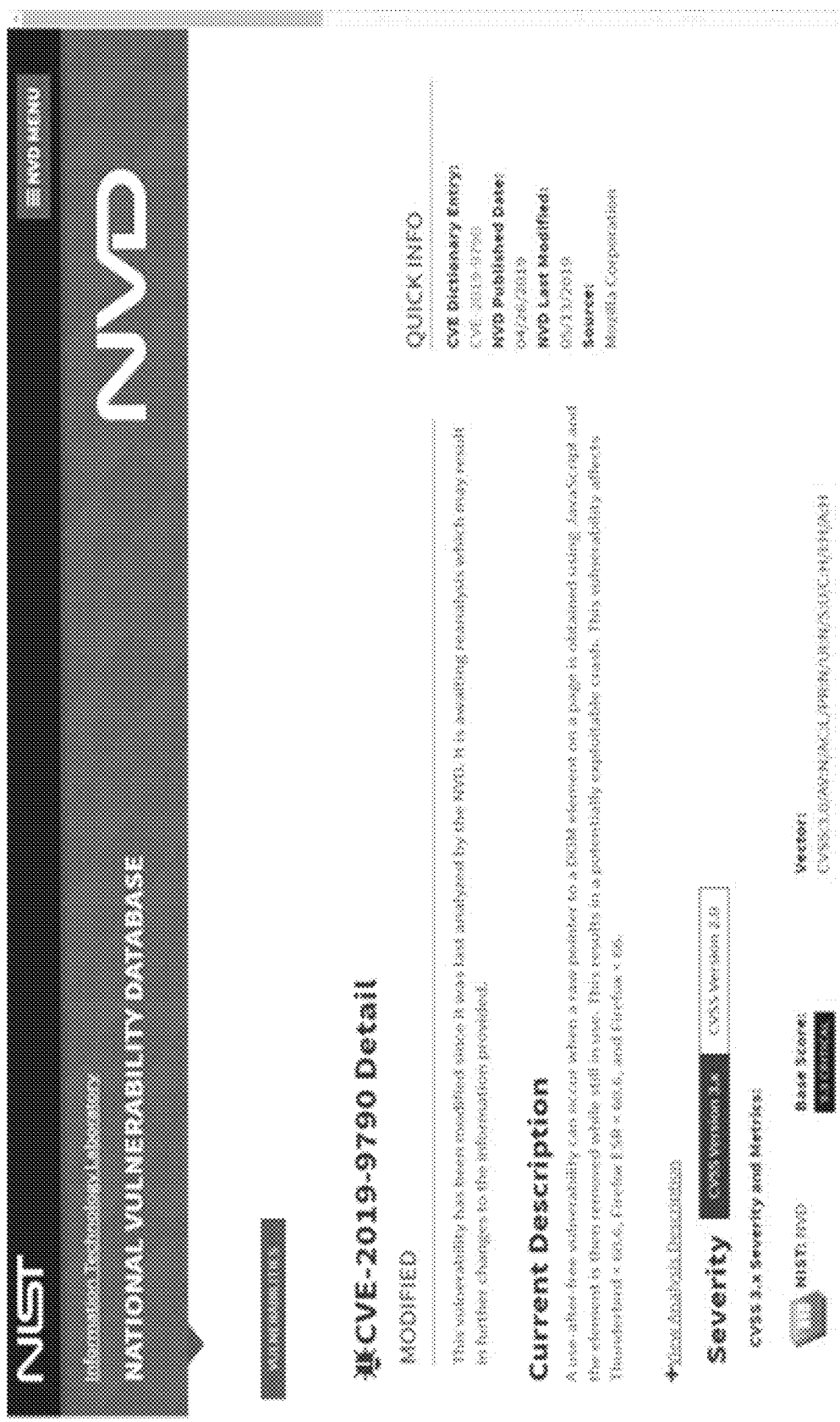
Figure 2C:
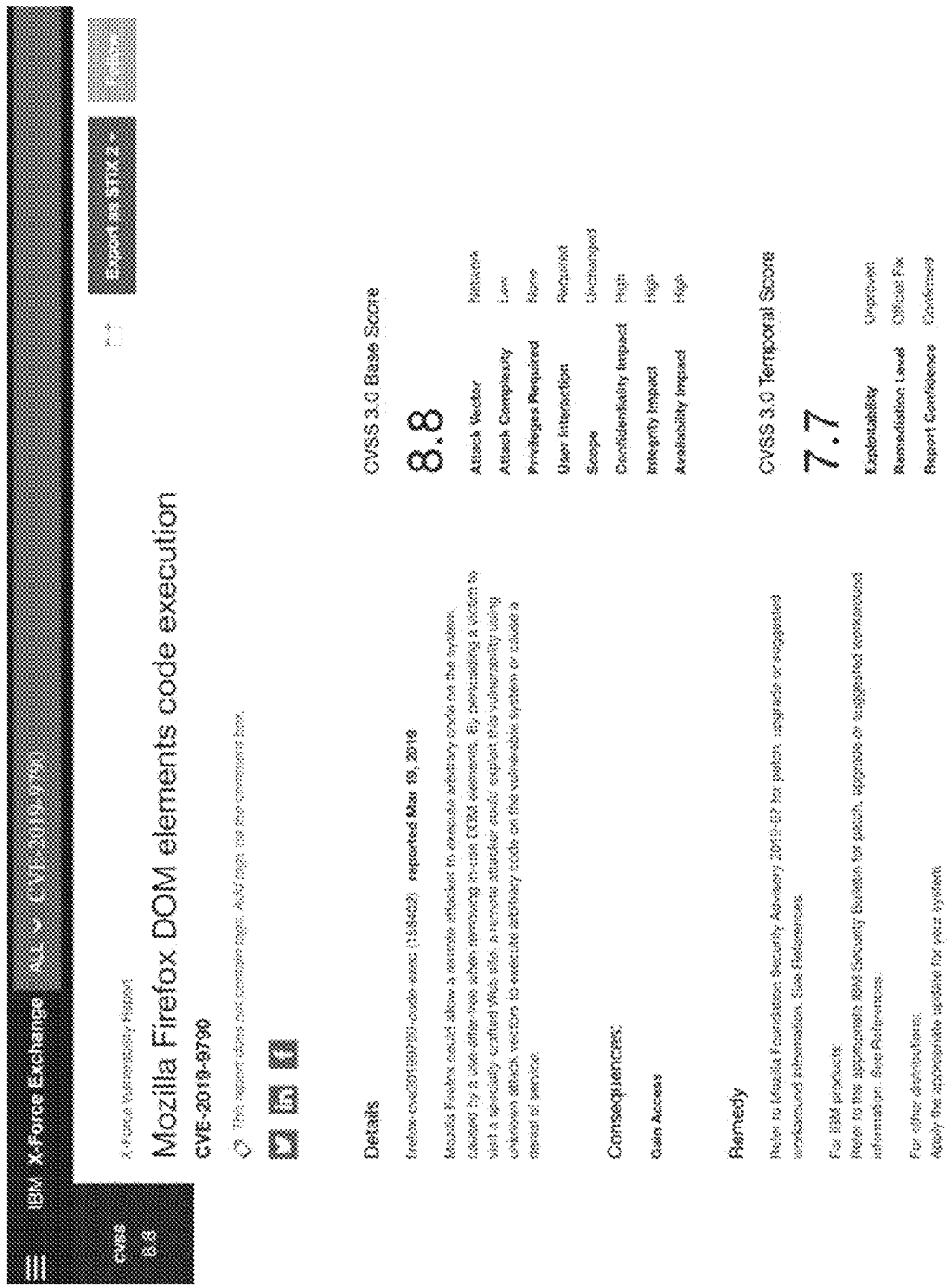

In step 1-1, a vulnerability report is collected from vulnerability databases CVE, NVD and IBM X-Force Exchange according to a CVE-ID, and the screenshots of vulnerability reports of the three databases are shown in FIGS. 2A, 2B and 2C, respectively.

In step 1-2, the extracted vulnerability report is pre-treated to remove redundant information in the report, and description information, an issue date, a CVSS score, a CWE category and a related link in the report are acquired to obtain the vulnerability report data set.

Further, the process of extracting the trigger word on the vulnerability event and determining the vulnerability type through the trigger word in step 2 includes steps 2-1, 2-2, and 2-3.

In step 2-1, the description in the vulnerability report is manually labeled by BIO labeling, and a cause of a vulnerability event is taken as an event trigger word. As shown in FIG. 3, "Double free vulnerability" is the cause (that is, the trigger word) in the description of the sentence, so the three words are labeled as "B-Trigger", "I-Trigger", and "I-Trigger", respectively. In addition, all other words in the sentence are labeled as "O". In this manner, a vulnerability event trigger word label set is constructed, and 80% of the description data is randomly selected as a training set while the remaining 20% is taken as a test set.

In step 2-2, a sequence labeling task training is performed on a BERT model by using the vulnerability event trigger word label set constructed in step 2-1, as shown in FIG. 4. The word embedding layer of BERT includes three embedding layers, that is, a token embedding layer, a segment embedding layer, and a position embedding layer. In addition, after the input sentence is segmented, two special tokens are inserted at the beginning ([CLS]) and the end ([SEP]) of the segmentation result. Then, a trigger word is extracted by using the trained model.

In step 2-3, the trigger word extracted in step 2-2 is classified by a softmax classifier, and the category is shown in Table 1. In multinomial logistic regression and linear discriminant analysis, the input of the softmax function is a result obtained from K different linear functions, and the probability that the sample vector xx belongs to the $j$-th category is:

$$P(y=j) = \frac{e^{x^T W_j}}{\sum_{k=1}^{K} e^{x^T W_k}}.$$

In the above function, yy denotes a certain category, xx is a sample vector, $x^T x^T$ is a transposed vector of the sample vector, and W is a weight parameter. The numerator of the function refers to the mapping of a real output to zero to positive infinity through an exponential function while the denominator refers to obtaining a sum of all the results and then normalizing of the sum. The sum of the probability values that the sample vector x belongs to each category is 1, and the highest probability value is selected as the category type of the sample.

TABLE 1

| Trigger word type table of vulnerability event | | |
| --- | --- | --- |
| Trigger word type of vulnerability event | Type abbreviation | Related description |
| Time-related Vul | TIM | which refers to security vulnerabilities that can be exploited for attack with specific competition conditions or other strict time requirements (such as thread deadlock and thread concurrency). |
| Configuration Vul | CON | which refers to security vulnerabilities used by an attacker through certain security configuration errors (such as improper access control, default settings, and authority management). |
| Input Validation Vul | INP | which refers to security vulnerabilities caused by improper input validation (such as SQL injection, cross-site scripting (XSS), format string attacks, and HTTP response splitting). |
| Memory Vul | MEM | which refers to the attack on a software system by consuming a large amount of physical resources (such as memory) without releasing |

TABLE 1-continued

Trigger word type table of vulnerability event

| Trigger word type of vulnerability event | Type abbreviation | Related description |
|---|---|---|
| | | these physical resources or by manipulating such resources in the wrong way (such as buffer overflows, memory leak, and stack depletion). |
| Logic Resource Vul | LOG | which refers to security vulnerabilities that can be exploited by repeatedly leaking logic resources without releasing the logic resources (such as computing time and infinite loops). |
| Numeric Vul | NUM | which refers to security vulnerabilities that can be exploited by accumulating numeric errors (such as integer overflows). |
| Unknown Vul | UNK | which refers to security vulnerabilities whose category cannot be analyzed due to insufficient description information in the security vulnerability report. |

Further, the process of extracting vulnerability event elements and performing information completion in step 3 includes steps 3-1, 3-2, 3-3, and 3-4.

In step 3-1, event elements in the vulnerability event are defined, including a triggering operation, an affected version, an attacker, a consequence, and a location, whose descriptions are shown in Table 2.

TABLE 2

Vulnerability event element description table

| Vulnerability event element type | element type abbreviation | Related description |
|---|---|---|
| Triggering Operation | Ope | operations through which the vulnerability is triggered, such as a crafted application that uses the fork system call |
| Occurrence Situation | Sit | situations where a vulnerability occurs, for example, Secure Sockets Layer (SSL) is used |
| Attacker | Atk | vulnerability attackers, such as remote attacker and local user |
| Affected Version | Ver | product versions affected by the vulnerability, such as Linux kernel before 2.6.34 |
| Consequence | Con | consequences caused by the vulnerability, such as execution of arbitrary commands |
| Location | Loc | locations where the vulnerability occurs, such as dispatch_cmd function in prot. c |

In step 3-2, the description in the vulnerability report is manually labeled. As shown in FIG. 5, the useless words including trigger words are labeled as "0", and the event elements such as triggering operations, occurrence situations and attackers are labeled accordingly. For example, "Linux kernel before 2.6.22" is labeled as "B-Ver", "I-Ver", "I-Ver", and "I-Ver", respectively. Based on the above labeling, a vulnerability event element label set is constructed, and 80% of the description data is randomly selected as a training set while the remaining 20% is taken as a test set.

In step 3-3, a sequence labeling task training is performed on a BERT model by using the vulnerability event element label set constructed in step 3-2, and a BiLSTM layer and a CRF layer are connected by using the trained model to perform event element extraction, as shown in FIG. 6. The BiLSTM layer is used for extracting features while the CRF layer is used for adding some constraints to the final predicted labels to ensure that the predicted labels are legal. In the data training process, these constraints can be automatically learned through the CRF layer. The constraints that might be learned are: 1) the first word in a sentence always starts with a label "B-" or "0" rather than "I-"; 2) in the labels "B-label1 I-label2 I-label3 I- . . . ", label 1, label2 and label3 should belong to the same class of entities, For example, "B-Con I-Con" is a legal sequence while "B-Con I-Atk" is an illegal tag sequence; and 3) the label sequence "0 I-label" is an illegal label sequence, because the first label of an entity label should be "B-" rather than "I-", in other words, a valid label sequence should be "0 B-label".

In step, since some event elements may be missing from the CVE and NVD descriptions, the event element is extracted by using the BERT+BiLSTM+CRF model in steps 3-1 to 3-3 in conjunction with the description in IBM X-Force Exchange to complete the missing elements. As can be known from the examples in FIGS. 7A and 7B, elements of attacker and consequence are missing from the CVE/NVD description of CVE-2017-3169 in FIG. 7A, while the two missing information can be found in the corresponding description of IBM X-Force Exchange in FIG. 7B, so that the vulnerability event elements are supplemented.

Further, the process of the extracting relation between vulnerability events in step 4 includes steps 4-1 and 4-2.

Figure 8:
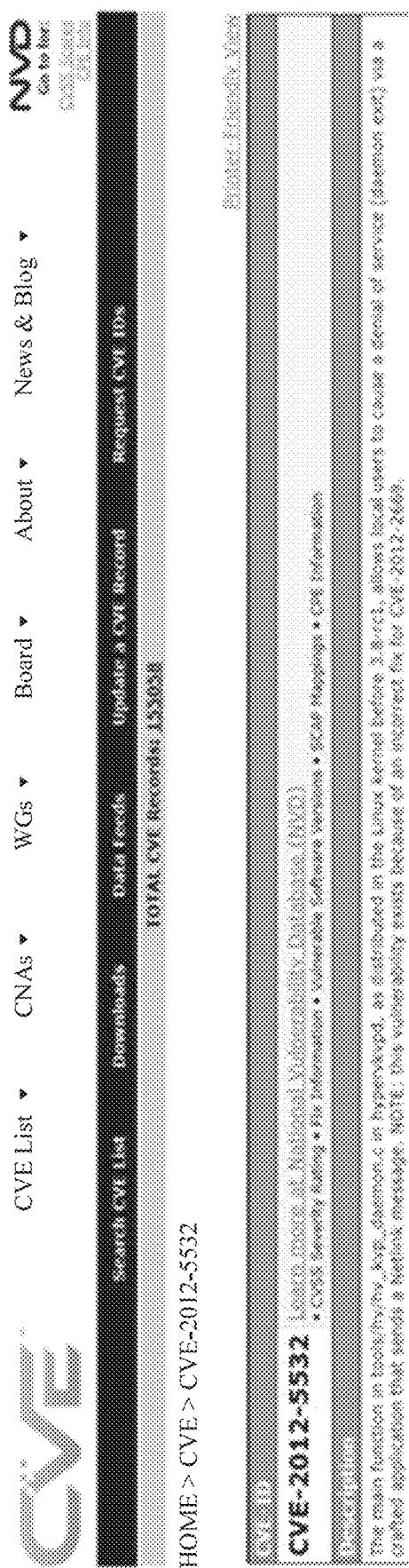
FIG. 8 is a schematic diagram of an explicit relation between vulnerability events according to an embodiment.

In step 4-1, as can be known in conjunction with FIG. 8, there are explicit relations between events in the vulnerability report, and the types of relations are shown in Table 3. For example, as can be seen from "NOTE: this vulnerability exists because of an incorrect fix for CVE-2012-2669." in the description of CVE-2012-5532 in FIG. 8, the occurrence of CVE-2012-5532 is caused by the error repair of CVE-2012-2669, which is a causal relation. The explicit relation between vulnerability events is extracted through related sentence pattern templates.

TABLE 3

Vulnerability explicit relation type table

| Vulnerability explicit relation type | Relation type abbreviation | Related sentence pattern |
|---|---|---|
| Similar Relation | Sim | a similar issue to . . . <br> this issue is very similar to . . . |
| Causal Relation | Cau | this vulnerability exists because of an incorrect/incomplete/insufficient fix for . . . |
| Brother Relation | Bro | a different vulnerability than . . . <br> this issue was SPLIT from . . . |

TABLE 3-continued

Vulnerability explicit relation type table

| Vulnerability explicit relation type | Relation type abbreviation | Related sentence pattern |
|---|---|---|
| Regression Relation | Reg | this issue exists because of a . . . regression |
| Included Relation | Inc | the scope of . . . is limited to the . . . product<br>this is an even more permissive variant of . . . |
| Dependency Relation | Dep | this can be leveraged/exploited by . . . attackers using . . . |

Figure 9A:
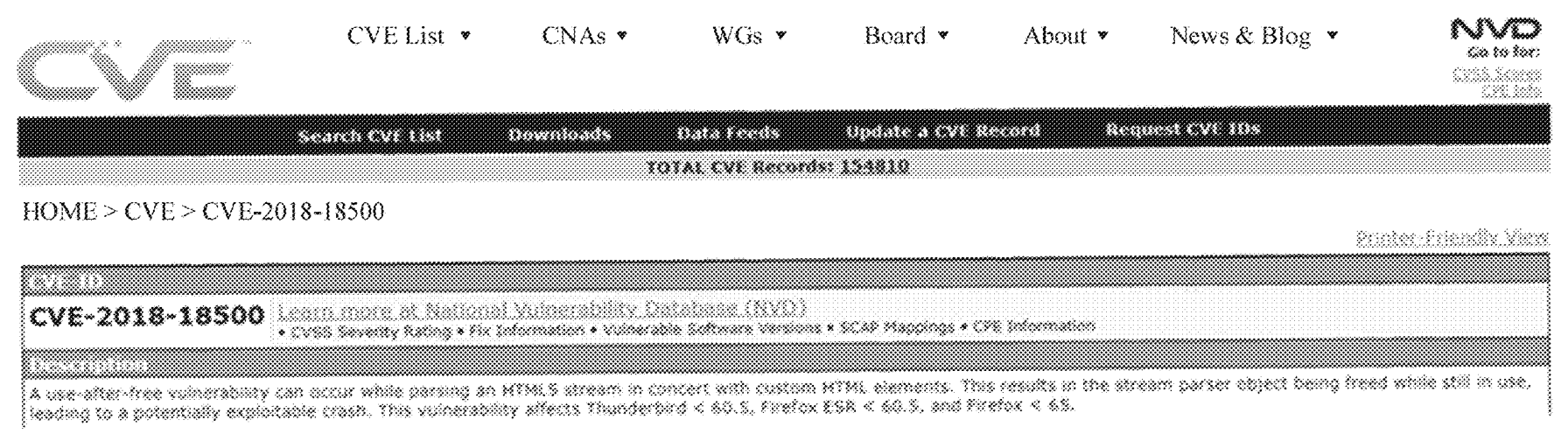
Figure 9B:
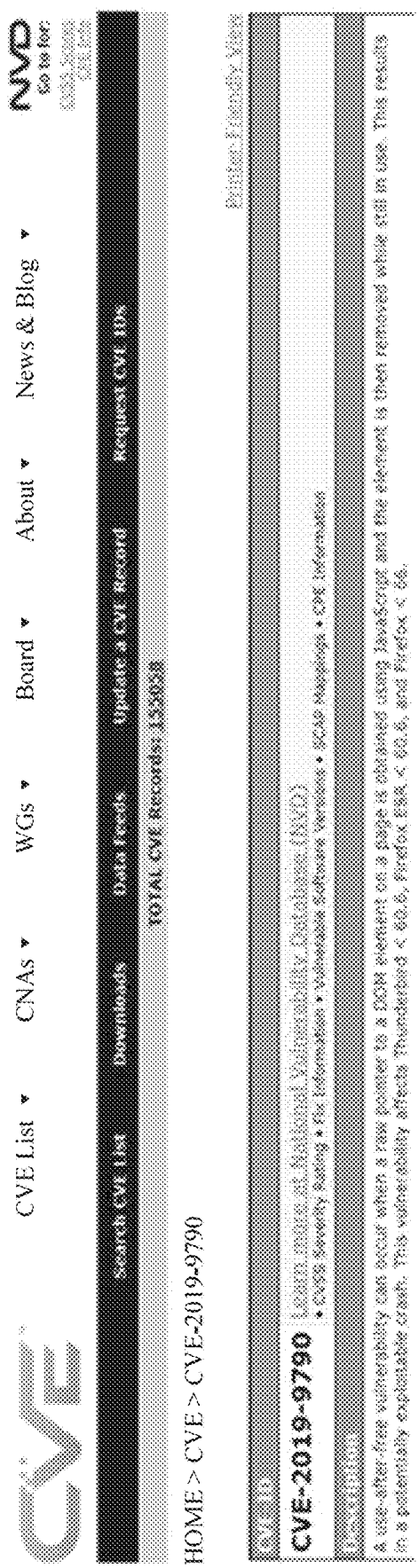

In step 4-2, as can be known in conjunction with FIGS. 9A and 9B, there are implicit relations between events in the vulnerability report. For example, as can be seen from FIGS. 9A and 9B, the descriptions of CVE-2018-18500 and CVE-2019-9790 are similar, so there is an implicit relation between vulnerability events. Similarity calculation is performed on the description statements of the vulnerability event and the implicit similar relation is extracted. First, the two description statements are vectorized through BERT, and then the similarity of the two description statements is calculated by using cosine similarity, so as to determine whether the two description statements are in a similar relation.

Further, the process of performing the vulnerability-related code representation in step 5 includes: all data in a vulnerability data set is subjected to code representation, and vulnerability codes are represented as an AST, a CFG and a PDG with the tool Joern. The codes are represented as a composite graph structure through the AST, the CFG and the PDG, and the data transfer and control in the codes depend on directed edges to connect each graph node.

Figure 10:
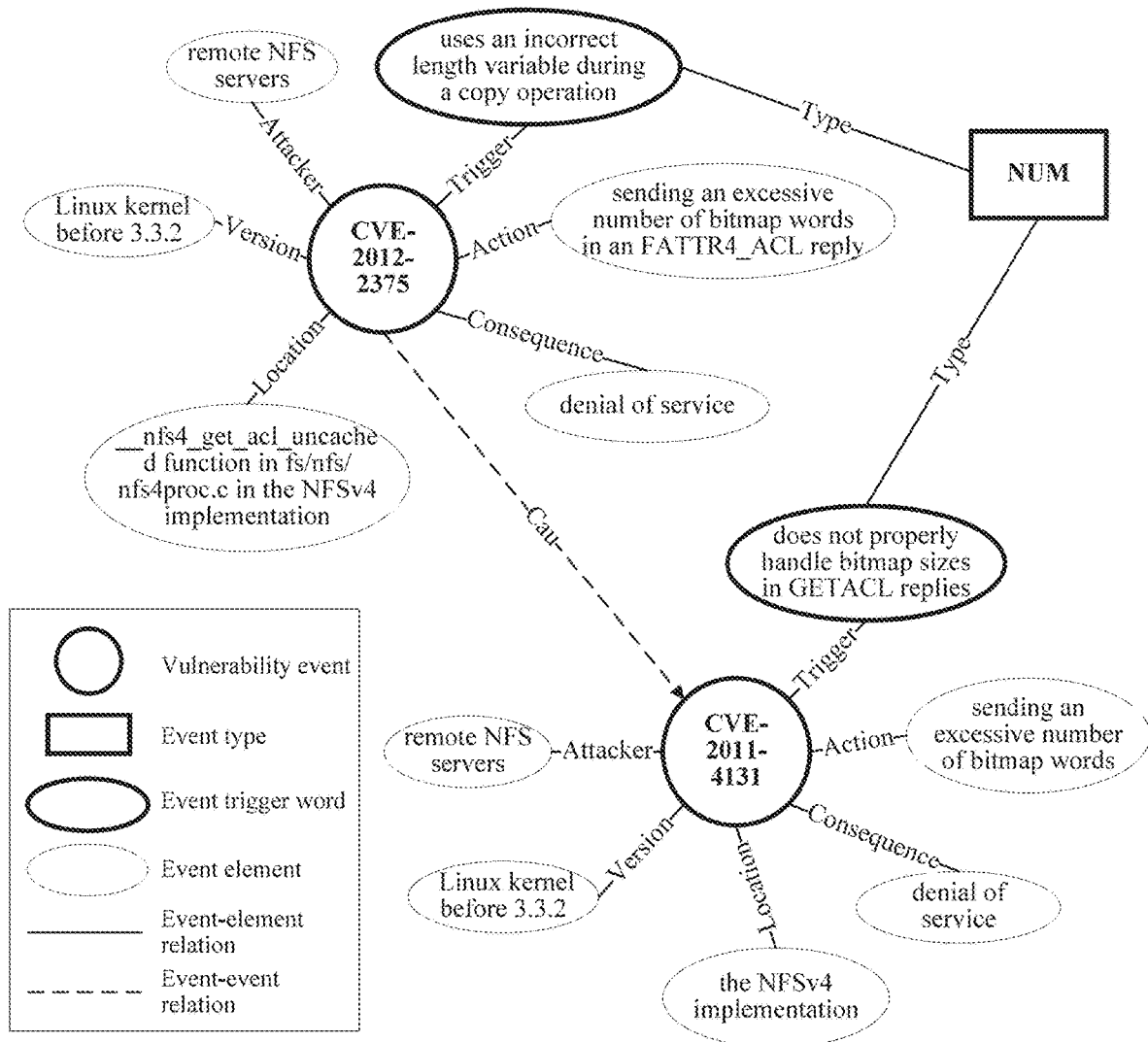
FIG. 10 is a partial schematic diagram of a vulnerability event graph according to an embodiment.

Further, the process of the visualizing vulnerability event information obtained in the above steps into a vulnerability event graph is step 6 includes: the event trigger words, event elements, event relations and code representations obtained in the above steps 2, 3, 4 and 5 are visualized with the tool Neo4j to form a vulnerability event graph. For example, FIG. 10 is a partial schematic diagram of the vulnerability event graph (the basic elements such as the issue dates and CVSS scores of vulnerability events, extracted triggering operations and nodes represented by related codes are omitted in the graph).

The present disclosure provides an automatic event graph construction technology and system for multi-source vulnerability information for the vulnerability data mining field. Such a technology integers a variety of information related to vulnerabilities, identifies the information, and finally visualizes the information by using visualization tools. First, the automatic construction of the vulnerability event graph can enable developers to understand vulnerability events and factors related to the vulnerability events more intuitively, reduce the manpower and time cost for developers to manually analyze and understand vulnerability data, and improve the effectiveness and efficiency of software maintenance. Second, the constructed vulnerability event graph can be regarded as the foundation of vulnerability analysis and repair by the researchers and vulnerabilities can be analyzed and repaired more quickly and accurately by using the knowledge formed by a large amount of data in the graph, thereby reducing potential safety hazards and economic losses caused by vulnerabilities.

Based on the same intention concept, in an embodiment, the present disclosure provides an automatic event graph construction system for multi-source vulnerability information. The system includes a data set construction module, a trigger word extraction module, a vulnerability event element identification module, a vulnerability event relation identification module, a vulnerability code representation module, and a visualization module. The data set construction module is configured to crawl a vulnerability report from a vulnerability database according to a CVE-ID and construct a vulnerability report data set. The trigger word extraction module is configured to take a cause of vulnerability as an event trigger word, construct a vulnerability event trigger word label set, extract a trigger word of a vulnerability event, and determine a vulnerability type through the trigger word. The vulnerability event element identification module is configured to extract vulnerability event elements from description information of a vulnerability by named-entity recognition and perform information completion. The vulnerability event relation identification module is configured to extract an explicit relation between vulnerability events by using text information and extract an implicit relation between vulnerability events by using text similarity. The vulnerability code representation module is configured to perform vulnerability-related code representation. The visualization module is configured to visualize obtained vulnerability event information into a vulnerability event graph; where the graph includes vulnerability event related elements and a relation between vulnerability events, and vulnerability events are associated with vulnerability types through the event trigger word. For the implementation details of each module, reference may be made to the above-mentioned automatic event graph construction method for multi-source vulnerability information, which will not be repeated here.

Based on the same invention concept, in an embodiment, the present disclosure provides an automatic event graph construction device for multi-source vulnerability information. The device includes a memory, a processor, and a computer program stored on the memory and executable by the processor, where the computer program, when loaded into the processor, performs the above-mentioned automatic event graph construction method for multi-source vulnerability information.

The above illustrates and describes basic principles, main features and advantages of the present disclosure. It is to be understood by those skilled in the art that the present disclosure is not limited to the above embodiments. The above embodiments and description stated above just provide the principle of the present disclosure. Various modifications and improvements may be made in the present disclosure without departing from the spirit and scope of the present disclosure, and these modifications and improvements all fall within the scope of the present disclosure. The scope of the present disclosure is defined by the appended claims and equivalents thereof

What is claimed is:

1. An automatic event graph construction method for multi-source vulnerability information, comprising:
    step 1, crawling a vulnerability report from a vulnerability database according to a Common Vulnerabilities and Exposures identifier (CVE-ID), and constructing a vulnerability report data set;
    step 2, taking a cause of vulnerability as an event trigger word, constructing a vulnerability event trigger word label set, extracting a trigger word of a vulnerability event, and determining a vulnerability type through the trigger word;

step 3, extracting vulnerability event elements from description information of a vulnerability by named-entity recognition, performing information completion, training a sequence labeling task of a BERT model by using a constructed vulnerability event element label set, and performing event element extraction by connecting a Bi-Directional Long Short-Term Memory (BiLSTM) layer and a Conditional Random Field (CRF) layer using the trained model, wherein the vulnerability event elements comprise a triggering operation, an occurrence situation, an attacker, an affected version, a consequence, and a location;

step 4, extracting an explicit relation between vulnerability events by using text information, extracting an implicit relation between vulnerability events by using text similarity, extracting an explicit relation between vulnerability events through a sentence pattern template, and extracting a vulnerability implicit similar relation by calculating a vectorized cosine similarity of vulnerability description information, wherein an explicit vulnerability relation type comprises at least one of a similar relation, a causal relation, a brother relation, a regression relation, an included relation or a dependency relation;

step 5, performing vulnerability-related code representation; and step 6, visualizing vulnerability event information obtained from steps 2 to 5 into a vulnerability event graph; wherein the graph comprises vulnerability event related elements and a relation between vulnerability events, and the vulnerability event is associated with the vulnerability type through the event trigger word.

2. The automatic event graph construction method for the multi-source vulnerability information according to claim 1, wherein the step 1 comprises: collecting a vulnerability report from vulnerability databases Common Vulnerabilities and Exposures (CVE), National Vulnerability Database (NVD) and IBM X-Force Exchange according to the CVE-ID; and acquiring description information, a release date, a Common Vulnerability Scoring System (CVSS) score, a Common Weakness Enumeration (CWE) category and a related link in the report to obtain a vulnerability report data set.

3. The automatic event graph construction method for the multi-source vulnerability information according to claim 1, wherein the step 2 comprises: performing sequence labeling task training on a Bidirectional Encoder Representations from Transformers (BERT) model by using a vulnerability event trigger word label set, and extracting trigger words by using the trained model; and classifying the extracted trigger words by using a softmax classifier, wherein the vulnerability type comprises at least one of a time-related vulnerability, a configuration vulnerability, an input validation vulnerability, a memory vulnerability, a logic resource vulnerability, a numeric vulnerability or an unknown vulnerability.

4. The automatic event graph construction method for the multi-source vulnerability information according to claim 2, wherein the step 3 comprises: in a case where part of the event elements are missed in CVE and NVD descriptions, completing the event elements by using a description in IBM X-Force Exchange.

5. The automatic event graph construction method for the multi-source vulnerability information according to claim 1, wherein the step 5 comprises: representing a vulnerability code as at least one of an abstract syntax tree (AST), a control-flow graph (CFG) or a program dependence graph (PDG).

6. An automatic event graph construction device for multi-source vulnerability information, comprising: a memory, a processor, and a computer program stored on the memory and executable by the processor, wherein the computer program, when loaded into the processor, performs the following steps:

step 1, crawling a vulnerability report from a vulnerability database according to a Common Vulnerabilities and Exposures identifier (CVE-ID), and constructing a vulnerability report data set;

step 2, taking a cause of vulnerability as an event trigger word, constructing a vulnerability event trigger word label set, extracting a trigger word of a vulnerability event, and determining a vulnerability type through the trigger word;

step 3, extracting vulnerability event elements from description information of a vulnerability by named-entity recognition, performing information completion, training a sequence labeling task of a BERT model by using a constructed vulnerability event element label set, and performing event element extraction by connecting a Bi-Directional Long Short-Term Memory (BiLSTM) layer and a Conditional Random Field (CRF) layer using the trained model, wherein the vulnerability event elements comprise a triggering operation, an occurrence situation, an attacker, an affected version, a consequence, and a location;

step 4, extracting an explicit relation between vulnerability events by using text information, extracting an implicit relation between vulnerability events by using text similarity, extracting an explicit relation between vulnerability events through a sentence pattern template, and extracting a vulnerability implicit similar relation by calculating a vectorized cosine similarity of vulnerability description information, wherein an explicit vulnerability relation type comprises at least one of a similar relation, a causal relation, a brother relation, a regression relation, an included relation or a dependency relation;

step 5, performing vulnerability-related code representation; and step 6, visualizing vulnerability event information obtained from steps 2 to 5 into a vulnerability event graph; wherein the graph comprises vulnerability event related elements and a relation between vulnerability events, and the vulnerability event is associated with the vulnerability type through the event trigger word.

7. The device according to claim 6, wherein the step 1 comprises: collecting a vulnerability report from vulnerability databases Common Vulnerabilities and Exposures (CVE), National Vulnerability Database (NVD) and IBM X-Force Exchange according to the CVE-ID; and acquiring description information, a release date, a Common Vulnerability Scoring System (CVSS) score, a Common Weakness Enumeration (CWE) category and a related link in the report to obtain a vulnerability report data set.

8. The device according to claim 6, wherein the step 2 comprises: performing sequence labeling task training on a Bidirectional Encoder Representations from Transformers (BERT) model by using a vulnerability event trigger word label set, and extracting trigger words by using the trained model; and classifying the extracted trigger words by using a softmax classifier, wherein the vulnerability type comprises at least one of a time-related vulnerability, a configuration vulnerability, an input validation vulnerability, a memory vulnerability, a logic resource vulnerability, a numeric vulnerability or an unknown vulnerability.

9. The device according to claim 7, wherein the step 3 comprises: in a case where part of the event elements are missed in CVE and NVD descriptions, completing the event elements by using a description in IBM X-Force Exchange.

10. The device according to claim 6, wherein the step 5 comprises: representing a vulnerability code as at least one of an abstract syntax tree (AST), a control-flow graph (CFG) or a program dependence graph (PDG).

11. A non-transitory computer-readable storage medium, which is configured to store a computer program, wherein a processor is configured to, when executing the computer program, perform the following steps:
  step 1, crawling a vulnerability report from a vulnerability database according to a Common Vulnerabilities and Exposures identifier (CVE-ID), and constructing a vulnerability report data set;
  step 2, taking a cause of vulnerability as an event trigger word, constructing a vulnerability event trigger word label set, extracting a trigger word of a vulnerability event, and determining a vulnerability type through the trigger word;
  step 3, extracting vulnerability event elements from description information of a vulnerability by named-entity recognition, performing information completion, training a sequence labeling task of a BERT model by using a constructed vulnerability event element label set, and performing event element extraction by connecting a Bi-Directional Long Short-Term Memory (BiLSTM) layer and a Conditional Random Field (CRF) layer using the trained model, wherein the vulnerability event elements comprise a triggering operation, an occurrence situation, an attacker, an affected version, a consequence, and a location;
  step 4, extracting an explicit relation between vulnerability events by using text information, extracting an implicit relation between vulnerability events by using text similarity, extracting an explicit relation between vulnerability events through a sentence pattern template, and extracting a vulnerability implicit similar relation by calculating a vectorized cosine similarity of vulnerability description information, wherein an explicit vulnerability relation type comprises at least one of a similar relation, a causal relation, a brother relation, a regression relation, an included relation or a dependency relation;
  step 5, performing vulnerability-related code representation; and
  step 6, visualizing vulnerability event information obtained from steps 2 to 5 into a vulnerability event graph; wherein the graph comprises vulnerability event related elements and a relation between vulnerability events, and the vulnerability event is associated with the vulnerability type through the event trigger word.

* * * * *